Figure 3:
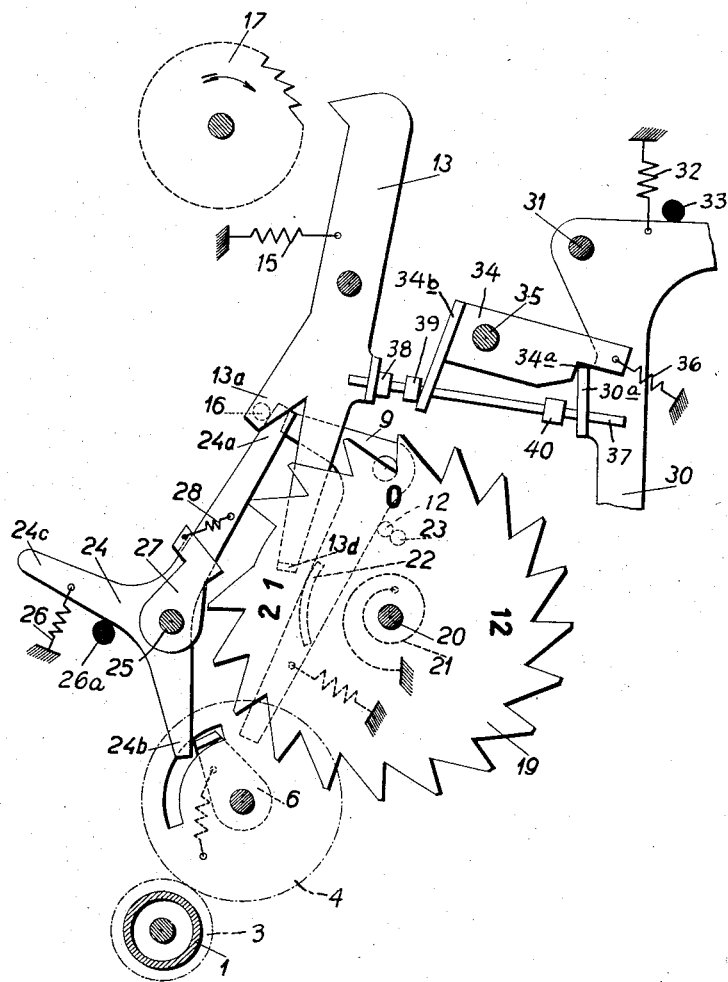

Sept. 30, 1958 J. KOVÁŘÍK 2,853,929
FILM FEEDING MECHANISM
Filed Feb. 7, 1956 3 Sheets-Sheet 1
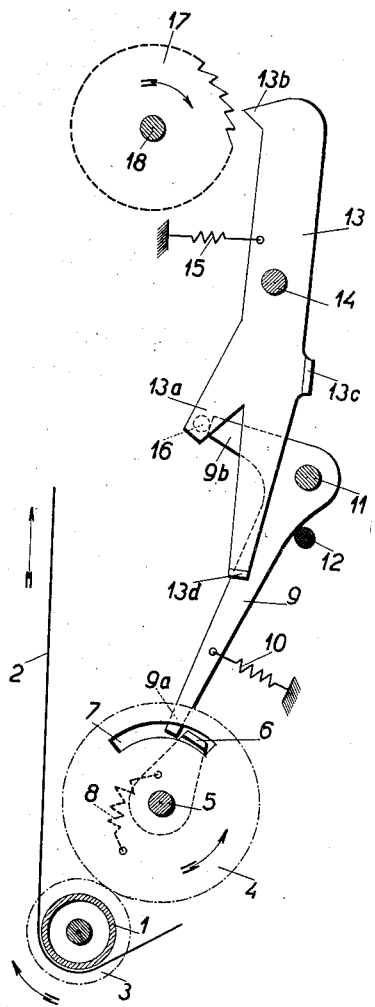
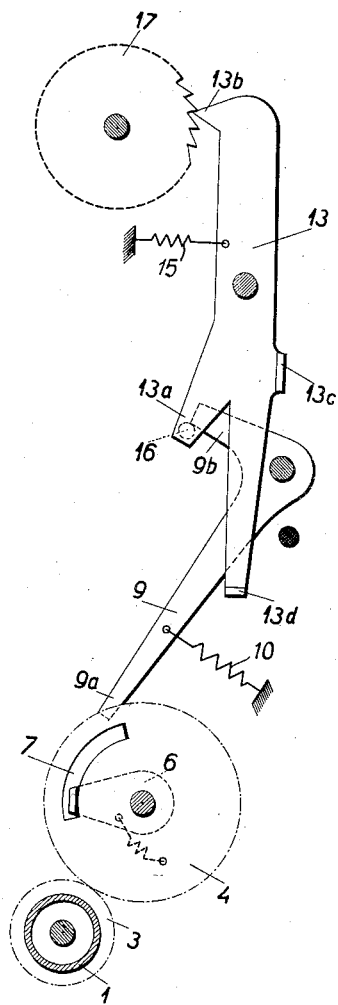
FIG. 1
FIG. 2
INVENTOR.
Josef Kovářík
BY Sept. 30, 1958      J. KOVAŘIK      2,853,929
FILM FEEDING MECHANISM Filed Feb. 7, 1956      3 Sheets-Sheet 2

INVENTOR.
Josef Kovařik
BY Richard Ernst
Ag't

INVENTOR.
Josef Kovářík
BY

United States Patent Office 2,853,929
Patented Sept. 30, 1958

2,853,929
FILM FEEDING MECHANISM

Josef Kovařík, near Lipnik N. Becvou, Czechoslovakia, assignor to Meopta národní podnik, Prerov, Czechoslovakia Application February 7, 1956, Serial No. 564,066

Claims priority, application Czechoslovakia March 2, 1955

5 Claims. (Cl. 95—31)

The present invention relates to improvements in a film feeding device for photographic roll film cameras.

It has been known to limit automatically the frame length in roll film cameras by causing the film to drive a measuring roller, which through a suitable transmission gear rotates a disc with a plurality of notches, adapted to be engaged by one arm of a retaining lever, while the other arm of the said lever meshes with a ratchet wheel provided on a shaft of the film feeding mechanism (see French Patents Nos. 49,182, 778,186 and German Patent No. 660,723).

A disadvantage of this device has been a series of transmission gears between the measuring roller and the notched disc, which render the mechanism complex and costly.

Further a mechanism has been known, in which the measuring roller drives a disc carrying only one single notch, into which—upon each revolution—slips one arm of a retaining lever, while the other arm of the said lever engages again a ratchet wheel secured to the shaft of the film feed mechanism (see Kodak, German Patents Nos. 615,385, 637,480 and 671,385). Such a device must have a special mechanism preventing the snapping-in of the retaining lever in an undesired moment.

In all the above mechanisms one arm of the retaining lever rests against the disc during the period when the film feed mechanism is unlocked, the said disc being thus considerably braked during the entire winding period by the influence of the relatively powerful spring required for locking the winding mechanism. The notched disc being driven by the measuring roller merely by the influence of its frictional engagement with the film, the limitation of the frame lengths may be unreliable.

In all these known film feeding devices it is always necessary to control the operation of the mechanism for limiting the frame lengths, in particular after the film has been inserted. The control may be carried out by adjusting the first number "1" on the protective paper strip in the window of the camera wall. In other devices the point of connection of the protective paper strip with the film or the lateral perforation operates the control member. Devices of this type are extremely complex and sensitive, because the slightly increased thickness in the point of connection produces a very slight control movement for the actuation of the transmission means of the mechanism for limiting the frame lengths (see German Patents Nos. 614,967, 621,420, 625,306).

According to the invention two retaining levers are provided between the film feed mechanism and the member controlled by the film; of these retaining levers one is adapted to snap into a ratchet wheel connected with the film feed mechanism, while the other lever is controlled by a member of the mechanism for limiting the frame lengths. The release of the first lever out of engagement with the ratchet wheel is effected by the mechanism for the release of the shutter and the said lever may be locked on the one hand by the other retaining lever, the lifting of which out of engagement is produced by a member of the mechanism for limiting the frame lengths, and on the other hand by the shot-counter.

The control of operation of the mechanism for limiting the frame lengths, in particular when winding the initial portion of the paper strip, when the film feed mechanism has to be rotated continually, is effected according to the invention by means of a cam guide provided on the disc of the shot counter, driven from the film by means of a rotatable member of the mechanism for limiting the frame lengths.

A further advantage of the present invention is the possibility of its use in photo cameras for several films of different width by merely adjusting the measuring roller in a suitable way, without the necessity of changing the transmission gears. In such photo cameras it is also only necessary to suitably adapt the counter for a different number of shots.

The accompanying drawings show in a diagrammatic representation by way of example a device carried out according to the present invention, said device being mounted inside the lateral wall of a reflex photo camera.

Figures 4, 5:
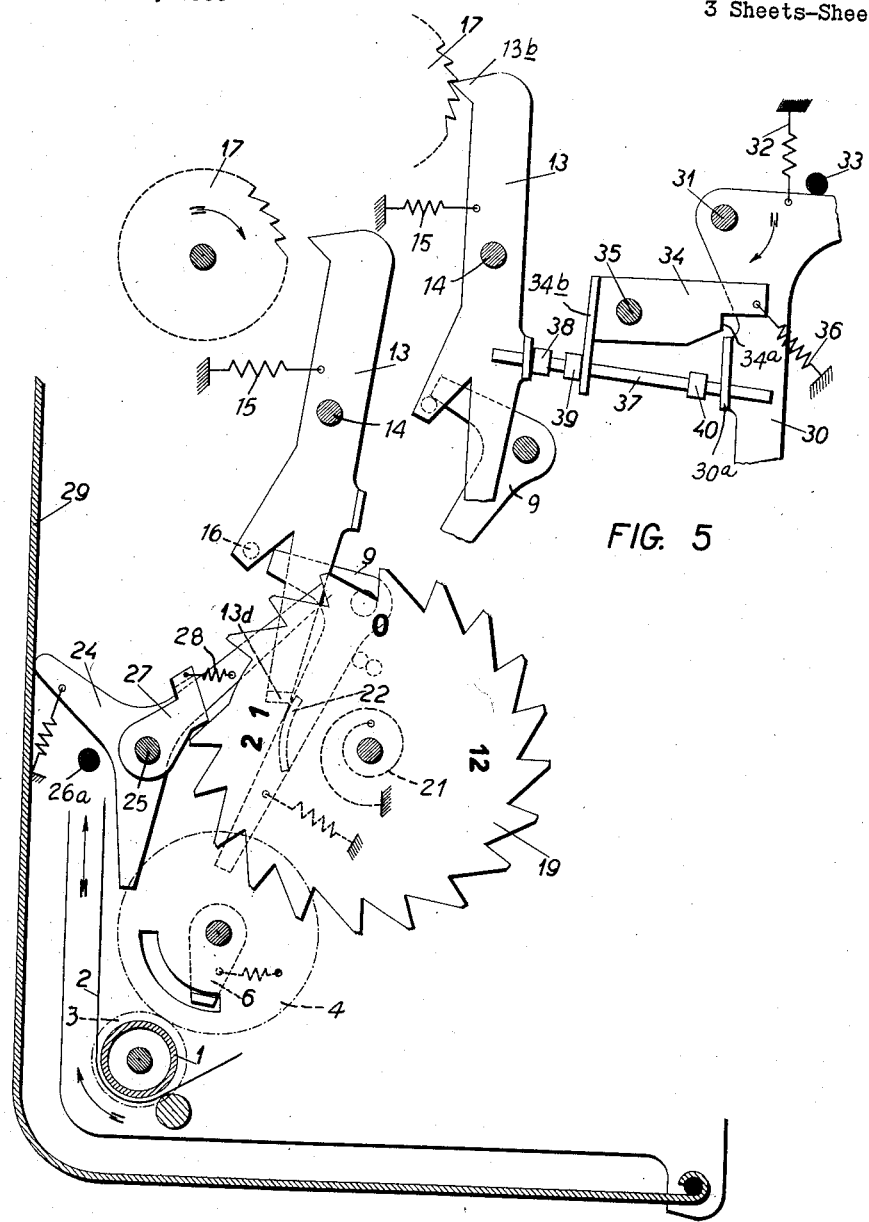

In the drawings:

Fig. 1 is a side view of the mechanism for limiting the frame lengths in its unlocked position, Fig. 2 shows the mechanism according to Fig. 1 after the film feed mechanism has been locked, Fig. 3 is a view of the mechanism with the shot counter and means for controlling the mechanism, when the rear cover of the camera is opened, Fig. 4 shows the mechanism according to Fig. 3 in its position after the rear cover of the mechanism has been closed, and Fig. 5 is a view of a detail of the releaser of the objective shutter.

Mechanism for limiting the frame lengths

A measuring roller 1 (Figs. 1 and 2) driven by a film 2 is connected with a toothed pinion 3 meshing with a gear wheel 4 mounted for rotation on a pivot 5. The diameter of the measuring roller 1 and the gear ratio are selected in such a way, that after the desired section of the frame length has been wound off, the gear wheel 4 has been rotated through 360°.

On the pivot 5 a cam secton 6 is further mounted for rotation, said sector being adapted to oscillate within the extent of a groove 7 provided in the gear wheel 4. The cam sector 6 is connected by a helical spring 8 with the gear wheel 4.

The mechanism for limiting the frame lengths comprises further a two-arm retaining lever 9 adapted to swing in one direction around a pivot 11 under the influence of a helical spring 10 secured to the body of the camera, the extreme position of the lever 9 being determined by a pin 12, and further a two-arm retaining lever 13 mounted for oscillation around a pivot 14. The lever 13 is acted upon in one direction by a helical spring 15 secured to the body of the camera. The retaining lever 9 consists of an arm 9a, cooperating with the cam sector 6 rotatable on the pivot 5, and of an arm 9b, cooperating with a pin 16 on an arm 13a of the retaining lever 13. The retaining lever 13 carries a dog 13b adapted to engage a ratchet 17 on a shaft 18 of the film feed mechanism. The retaining lever 13 is further provided with a projection 13c, cooperating with the means for releasing the lens shutter and with an arm 13d, cooperating with a cam guide on the disc of the shot counter.

During rotation of the film feed mechanism the retaining lever 13 is locked by the arm 9b of the retaining lever 9 engaging the pin 16. When the cam sector 6 on the pivot 5 swings out, the retaining lever 9 is rocked as well, so that its arm is freed from the pin 16 on the retaining lever 13 and the log 13b engages the teeth of the ratchet wheel 17 of the film feed mechanism, which is thus locked in position. The retaining lever 13 can be released from engagement with the ratchet wheel 17 by means of the mechanism for releasing the objective shutter.

Shot counter

A disc 19 of the shot counter (Figs. 3 and 4) provided at its circumference with teeth and mounted for rotation on a pivot 20 is adapted to be rotated in one direction by a spiral spring 21 secured to the body of the camera. A cam guide 22 is provided in the disc for the control of the mechanism during winding the initial portion of the film, said cam guide cooperating with the arm 13d of the retaining lever 13. During winding the end of the protective paper strip, a pin 23 cooperates with the arm 13d. The pin 23 serves also as a stop cooperating with the pin 12 when the disc 19 of the counter is rotated to the zero position.

Means for controlling the mechanism from the cover of the camera

This means comprises a three-arm lever 24 mounted for rotation on a pivot 25 and adapted to be rocked in one direction by a helical spring 26 secured to the body of the camera. The arm 24a of this three arm lever 24 cooperates on the one hand with the arm 13a of the retaining lever 13 and on the other hand, with a pawl 27, adapted to swing under the influence of a spring 28 on the pivot 25. The arm 24b of the lever 24 serves as an abutment for the cam sector 6 and the arm 24c cooperates with the wall 29 of the cover of the photo camera (Fig. 4). A stop for the lever 24 is designated 26a.

Mechanism for preventing double exposure

With the releaser of the lens shutter (not shown in the drawing) there cooperates a two arm lever 30, mounted for rotation on a pivot 31 and acted upon in one direction by a spring 32. This two arm lever 30 rests in its extreme spring urged position against a pin 33 and is adapted to be there locked by a latch lever 34, rotatable on a pivot 35. The lever 34, at one side of its pivot 35, has a notch 34a in its lower edge adapted to receive a lug 30a (Fig. 3) to prevent swinging of the latter away from its stop pin 33. The lever 34 is biased in the clockwise direction, as viewed in Figs. 3 and 5, by a helical spring 36, secured to the body of the camera, thereby to retain the notch 34a in locking engagement with the lug 30a. Both levers 30 and 34 and the retaining lever 13 are connected by means of a rod 37 carrying collars 38, 39 and 40 fastened thereon. The rod 37 passes through the lug 30a and through an extension 34b and the lever 34 at the side of the pivot 35 remote from the notch 34a so that movement of rod 37 from left to right, as viewed in Fig. 3, will move collar 39 against extension 34b to rock lever 34 in the direction raising the notch 34a out of engagement with lug 30a (Fig. 5), thereby to free the lever 30 for rocking in the direction of the arrow on Fig. 5.

Before opening the lens shutter, the lever 30 is rocked in the direction shown by the arrow, abuts against the collar 40, so that the rod 37 swings out the retaining lever 13 by means of the collar 38. The dog 13b is thus disengaged from the teeth of the ratchet wheel 17, unlocking thereby the film feed mechanism. At the same time the retaining lever 9 is rocked (see Fig. 1) by the influence of the helical spring 10 until it abuts against the pin 12, while the arm 9b supports the pin 16 on the retaining lever 13. After exposure, the releasing lever 30 returns under the influence of its spring into the original position and is automatically secured by the lever 34 (Fig. 5). After the film has been moved through a frame length, the dog 13b snaps into the teeth of the ratchet wheel 17. The projection 13c abuts at the same time against the collar 38 and shifts the rod 37. The collar 39 rocks the lever 34 and releases the two arm lever 30.

Operation of the mechanism for measuring frame lengths

When the photo camera is open (Fig. 3), the arm 24a of the three-arm lever 24 rests against the pin 16 on the retaining lever 13, so that the film feed mechanism is unlocked. The arm 24b is at the same time in the path of the cam sector 6, so that the rotation of the transmission gear 3, 4 and of the measuring roller 1 is prevented. The film 2 slides then over the immobile roller 1.

This arresting of the cam sector 6 by the influence of the arm 24b occurs always in the same place, so that this position is the initial position for the mechanism for measuring the frame lengths. After inserting the roll film 2 into the camera, when the rear cover 29 is open, the film feed mechanism is rotated by hand, the ratchet wheel 17 revolving in a direction shown by the arrow (Fig. 3). The film is wound until the triangular marks on the protective paper strip reach the marks provided on the body of the camera. The rear cover 29 of the camera is then closed, the arm 24c rocking thus the three-arm lever 24. The contact of the arm 24a with the pin 16 on the retaining lever 13 is thus interrupted and the arm 24b rocked out of the path of the cam sector 6. At the same time the pawl 27 is rocked so as to engage the teeth of the disc 19 of the shot counter.

When the arm 24a is released from engagement with the pin 16, the arm 13d abuts against the cam guide 22 on the disc 19 of the counter (Fig. 4). The film may then be wound by hand, because the ratchet wheel 17 is not engaged by the dog 13b. When the film is being wound, the cam sector 6 revolves and engages successively the teeth of the counter disc 19. During one revolution of the cam sector 6 the disc 19 travels always through one pitch and is retained in this position by the pawl 27. The film may thus be freely wound through the full length of the protective paper strip, i. e. from the first triangular marks as far as nearly the first exposure. The film feed mechanism is retained in its unlocked position during the full period of winding the film by the cam guide 22, provided on the disc 19 of the shot counter.

When the disc 19 is rotated as far as the number "1," the retaining lever 13 slips off the cam guide 22 and abuts with its pin 16 against the arm 9b of the retaining lever 9 (Fig. 1). After the retaining lever 9 has been rocked by the rotation of the cam sector 6, the retaining lever 13 is released and the dog 13b snaps into the teeth of the ratchet wheel 17 under the influence of the helical spring 15 (Fig. 2), locking thus the film feed mechanism. Simultaneously the lever 34 swings around the pivot 35 and releases the two-arm lever 30 with which the releaser of the lens shutter is connected. The camera is now ready for the first shot.

During the exposure the two-arm lever 30 swings around the pivot 31 and the rod 37 rocks the retaining lever 13, which unlocks the film feed mechanism. The two-arm lever 30 returns then by the influence of the spring 32 into its original position, in which it is locked by the two-arm lever 34. At the same time the releasing lever 9 swings under the influence of its spring 10 as far as the stop pin 12. The arm 9b abuts against the pin 16 on the retaining lever 13. This retaining lever 13 of the mechanism for measuring the frame lengths, is now locked by the arm 9b, so that the film feed mechanism may be rotated and the film wound on the spool. Simultaneously the measuring roller 1 starts to rotate, setting into operation the transmisison gear 3, 4 and the cam sector 6, which rotates the disc 19 through one tooth pitch and swings the retaining lever 9 so as to release the retaining lever 13, the dog 13b of which locks the film feed mechanism under the influence of the spring 15.

The whole operation may then be repeated as desired, until—after the twelfth exposure—a mark on the disc 19 of the counter indicating the end of the film appears in the window of the camera.

The pin 23 on the disc 19 is now positioned below the arm 13d of the retaining lever 13 and prevents the film feed mechanism from becoming locked. The disc 19 is in such a position, that a portion of its circumference free from teeth, is within the range of operation of the cam sector 6, which may be freely rotated without influencing the shot counter.

After winding the end of the protecting paper strip, the rear cover 29 of the camera is opened and the three-arm lever 24 rocks under the influence of the spring 26, its arm 24a swinging partially the pin 16 and the retaining lever 13. The pawl 27 is rocked at the same time and releases the disc 19 of the shot counter, which under the influence of the spring 21 revolves until the pin 23 abuts against the pin 12. The shot counter is thus automatically adjusted to "0" again, and the camera is ready for the insertion of another roll of film.

The present invention is, of course, in no way limited to the disclosed example and may be modified in many ways without departing from the scope of the inventive idea. So, for instance, the retaining levers 13 and 9 may be arranged closely next to each other, so as to reduce the dimensions of the mechanism.

I claim:

1. In a rollfilm camera having a film feed mechanism including a spindle which is rotated in response to operation of the mechanism, an exposure counter including a rotatable disc, and a lens shutter operating mechanism; the combination of a ratchet wheel rotatable with said spindle of the film feed mechanism, a first rockable lever yieldably urged to an engaged position where it halts rotation of said ratchet wheel and thereby prevents operation of the film feed mechanism, said first lever being rockable to a disengaged position where it releases said ratchet wheel to permit operation of the film feed mechanism, means acting in response to actuation of said lens shutter operating mechanism to rock said first lever to said disengaged position, a second rockable lever yieldably urged to an operative position where it engages said first lever and retains the latter in said disengaged position, said second lever being rockable to an inoperative position where it releases said first lever to permit movement of the latter to said engaged position, means turned in response to feeding of the film by the film feed mechanism and effective to rock said second lever to said inoperative position following the feeding of a predetermined frame length of the film thereby to permit movement of said first lever to said engaged position and consequent halting of the operation of said film feed mechanism until said first lever is again rocked to said disengaged position in response to actuation of the lens shutter operating mechanism, and means on said rotatable disc of the exposure counter engageable with said first lever to rock the latter to said disengaged position thereof during turning of said disc through predetermined angular ranges of its rotation corresponding to the feeding of initial and final portions of the roll film thereby to prevent halting of the operation of the film feed mechanism during the feeding of such initial and final portions of the roll film.

2. In a rollfilm camera having a film feed mechanism including a spindle which is rotated in response to operation of the mechanism, an exposure counter including a rotatable disc, and a lens shutter operating mechanism; the combination as in claim 1; wherein said means turned in response to feeding of the film includes a roller in frictional contact with the film and adapted to be rotated by advancement of the film, a rotatable cam sector operative to engage said second lever and to rock the latter to said inoperative position whenever said cam sector attains a predetermined angular position during each revolution thereof, and transmission means between said roller and said cam sector operative to rotate the latter through one complete revolution during the rotation of said roller by the advancement of the film through said predetermined frame length; and wherein said rotatable disc of the exposure counter has teeth on the periphery thereof engageable by said cam sector to effect the step-by-step turning of said rotatable disc in response to rotation of said cam sector, and further comprising a pawl engageable with said teeth of the rotatable disc to resist turning of the latter while free of said cam sector.

3. In a rollfilm camera having a film feed mechanism including a spindle which is rotated in response to operation of the mechanism, an exposure counter including a rotatable disc, and a lens shutter operating mechanism; the combination as in claim 2, further comprising a cover on the camera movable between opened and closed positions to permit the loading and removal of rollfilm, and a rockable three-armed lever yieldably urged to an operative position wherein a first arm thereof engages said first lever and moves the latter to said disengaged position and a second arm is interposed in the path of movement of said cam sector to prevent rotation of the latter and hence to prevent step-by-step turning of said disc of the exposure counter, a third arm of said three-armed lever being engageable by said cover in said closed position of the latter to rock said three-armed lever to an inoperative position wherein said first arm is disengaged from said first lever and said second arm is withdrawn from said path of travel of said cam sector, so that said three-armed lever frees the film feed mechanism for continued operation independent of the action of said first lever and also prevents operation of the exposure counter only when said cover is in the opened position during the loading and initial feeding of rollfilm in the camera.

4. In a rollfilm camera having a film feed mechanism including a spindle which is rotated in response to operation of the mechanism, an exposure counter including a rotatable disc, and a lens shutter operating mechanism; the combination as in claim 3, wherein said pawl is rockable with said three-armed lever to engage said teeth on the periphery of the rotatable disc when said three-armed lever is in said inoperative position of the latter and to be removed from engagement with said teeth in response to movement of said three-armed lever to said operative position of the latter, and further comprising yieldable means tending to return said rotatable disc of the exposure counter to an initial position so that, upon movement of said cover to said opened position, said pawl releases said disc for return of the latter to said initial position where it remains until said cover has been moved to said closed position.

5. In a rollfilm camera having a film feed mechanism including a spindle which is rotated in response to operation of the mechanism, an exposure counter including a rotatable disc, and a lens shutter operating mechanism; the combination as in claim 1, wherein said means acting in response to actuation of the lens shutter operating mechanism includes a release member which is rockable in one direction, by the lens shutter operating mechanism during actuation of the latter, transmission means between said release member and said first lever rocking the latter to said disengaged position in response to rocking of said release member in said one direction, latch means yieldably urged into engagement with said release member to prevent rocking of the latter in said one direction and thereby to prevent actuation of the lens shutter operating mechanism, and means operative in response to movement of said first lever from said disengaged position to said engaged position following the feeding of the predetermined frame length of the film to disengage said latch means from said release member, thereby to prevent the double exposure of any frame length of the rollfilm.

References Cited in the file of this patent

UNITED STATES PATENTS

| | | |
|---|---|---|
| 2,148,636 | Muller et al. | Feb. 28, 1939 |
| 2,301,956 | Kuppenbender et al. | Nov. 17, 1942 |

FOREIGN PATENTS

| | | |
|---|---|---|
| 400,828 | Italy | Dec. 22, 1942 |